United States Patent
Ortacdag et al.

(10) Patent No.: US 8,553,691 B2
(45) Date of Patent: Oct. 8, 2013

(54) EFFICIENT MULTICASTING IN A DISTRIBUTED SYSTEM ARCHITECTURE

(75) Inventors: Erel Ortacdag, Ottawa (CA); Nirmesh Patel, Kanata (CA)

(73) Assignee: Alcatel Lucent, Paris (FR)

( * ) Notice: Subject to any disclaimer, the term of this patent is extended or adjusted under 35 U.S.C. 154(b) by 276 days.

(21) Appl. No.: 13/032,298

(22) Filed: Feb. 22, 2011

(65) Prior Publication Data

US 2012/0213223 A1    Aug. 23, 2012

(51) Int. Cl.
*H04L 12/56*    (2011.01)

(52) U.S. Cl.
USPC .......................... 370/390; 370/354; 370/413

(58) Field of Classification Search
USPC .......................................... 370/390, 354, 413
See application file for complete search history.

(56) References Cited

U.S. PATENT DOCUMENTS

| | | | |
|---|---|---|---|
| 6,353,596 B1 | 3/2002 | Grossglauser et al. | |
| 6,870,844 B2 * | 3/2005 | Tuck et al. | 370/390 |
| 2002/0126669 A1 | 9/2002 | Tuck et al. | |
| 2002/0145786 A1 | 10/2002 | Change et al. | |
| 2004/0037279 A1 * | 2/2004 | Zelig et al. | 370/390 |
| 2008/0151890 A1 * | 6/2008 | Zelig et al. | 370/390 |
| 2009/0175274 A1 * | 7/2009 | Aggarwal et al. | 370/390 |
| 2011/0019440 A1 | 1/2011 | Shimada et al. | |

FOREIGN PATENT DOCUMENTS

WO    0072421    11/2000

OTHER PUBLICATIONS

International Search Report for PCT/CA2012/050079 dated May 9, 2012.
K. Kompella, Ed, Y. Rekhter, Ed, Virtual Private LAN Service (VPLS) Using BGP for Auto-Discovery and Signaling, Network Working Group, pp. 1-28,Copyright the IETF Trust (2007).
M. Lasserre, Ed, V. Kompella, Virtual Private LAN Service (VPLS) Using Distribution Protocol (LDP) Signaling, Network Working Group, pp. 1-31,Copyright the IETF Trust (2007).

* cited by examiner

*Primary Examiner* — Dang Ton
*Assistant Examiner* — Mewale Ambaye
(74) *Attorney, Agent, or Firm* — Kramer & Amado P.C.

(57) ABSTRACT

Embodiments of the invention are directed to multicasting packets in a system such as a data packet switch or router having a distributed architecture. A first device such as a line card receiving a packet that requires multicasting forwards the packet to a fabric switch where the packet is replicated to obtain one respective packet for each line card of the system. Each line card receives its respective packet from the fabric switch and further duplicates the packet to obtain a duplicate packet for each egress endpoint of a service associated with the packet that is eligible to receive such a duplicate packet. Replication and duplication of packets requiring multicasting performed in this manner efficiently uses bandwidth of the fabric switch and links connecting it to the line cards.

17 Claims, 2 Drawing Sheets

EFFICIENT MULTICASTING IN A DISTRIBUTED SYSTEM ARCHITECTURE

FIELD OF THE INVENTION

The invention is directed to multicasting data packets in a communications network, particularly to efficiently multicasting such packets in a switch or router having a distributed architecture.

BACKGROUND OF THE INVENTION

Virtual Private Local Area Network (LAN) Service (VPLS) is a Virtual Private Network technology that provides multipoint communication over Ethernet networks and is described in Internet Engineering Task Force (IETF) RFC 4761 and RFC 4762. When an Ethernet packet is received (ingress direction), its destination Media Access Control (MAC) address is looked up in a forwarding database. If there is no match for a unicast packet or if the packet has a multicast or a broadcast destination address then this packet needs to be duplicated and sent to every endpoint that is configured in the VPLS service. While the duplication is being done, two requirements of the VPLS service need to be met. The first requirement is called source suppression in which the incoming packet must not be sent back to where it is coming from. The second requirement is called split horizon and relates to split horizon groups. Split horizon is a loop prevention technique used among multiple endpoints that have loops amongst them which can be configured using split horizon groups.

In typical routers and switches having a distributed architecture, every line card is connected to each other line card via a fabric switch and fabric links connecting each line card to the fabric switch. The bandwidth among the line cards and the fabric switch is limited to the capacity of the fabric switch and fabric links. Packets requiring duplication, i.e. multicasting, can use a significant portion of that bandwidth. Therefore, an efficient way of multicasting packets in a system having a distributed architecture is desired.

SUMMARY

According to an aspect of the invention a method of multicasting a packet is provided. The method comprises: receiving the packet at a line card of a plurality of line cards in a system; determining if the packet requires multicasting; sending, responsive to the packet requiring multicasting, the packet with a multicast header to a fabric switch of the system; replicating, by the fabric switch, the packet to obtain a replicated packet; sending, by the fabric switch, the replicated packet to one or more line cards of the plurality of line cards; determining if any egress endpoints of a service associated with the packet are ineligible to receive a duplicate packet of the replicated packet; and providing the duplicate packet to each egress endpoint of the service except any such egress endpoint determined to be ineligible to receive the duplicate packet.

In some embodiments of the method the packet is a VPLS packet, the egress endpoints are VPLS egress endpoints, and the service is a VPLS service. Further, in some embodiments determining if the packet requires multicasting comprises performing, on a destination MAC address of the packet, a lookup operation in a forwarding database; and determining that the packet requires multicast forwarding responsive to the lookup operation failing to find the destination MAC address in the forwarding database or a result of the lookup operation indicating that the packet is a multicast or broadcast packet.

In some embodiments of the method determining if any VPLS egress endpoints of the VPLS service are ineligible to receive the duplicate packet comprises: determining that a first VPLS egress endpoint of the VPLS service matches a destination endpoint identifier of the VPLS packet and a source endpoint identifier of the VPLS packet, thereby making the first VPLS egress endpoint ineligible to receive the duplicate packet.

In some embodiments of the method determining if any VPLS egress endpoints of the VPLS service are ineligible to receive the duplicate packet further comprises: determining that a second VPLS egress endpoint matches a destination endpoint identifier of the VPLS packet; and determining that the destination endpoint identifier and a source endpoint identifier of the VPLS packet are in a same split horizon group, thereby making the second VPLS egress endpoint ineligible to receive the duplicate packet.

According to another aspect of the invention an apparatus for multicasting a packet is provided. The apparatus comprises: a first device operable to receive the packet; and a fabric switch coupled to the first device via a first fabric link, the fabric switch being operable to receive the packet from the first device and to replicate the packet to obtain a replicated packet. The first device is further operable to: determine if the packet requires multicasting; send, responsive to the packet requiring multicasting, the packet with a multicast header to the fabric switch; receive the replicated packet from the fabric switch; determine that an egress endpoint of a service associated with the packet and that corresponds to the first device is ineligible to receive a duplicate packet of the replicated packet; and provide the duplicate packet to egress endpoints of the service that correspond to the first device except such egress endpoints determined to be ineligible.

In some embodiments of the apparatus the packet is a Virtual Private Local Area Network (LAN) Service (VPLS) packet, the egress endpoints are VPLS egress endpoints, and the service is a VPLS service. Additionally or alternatively, in some embodiments the apparatus further comprises a second device coupled to the fabric switch via a second fabric link, the second device being operable to: receive the replicated packet from the fabric switch, determine that an egress endpoint of a service associated with the packet and that corresponds to the second device is ineligible to receive a duplicate packet of the replicated packet, and provide the duplicate packet to egress endpoints of the service that correspond to the second device except such egress endpoints determined to be ineligible.

Additionally or alternatively, in some embodiments the first and second devices are each further operable to: determine, for each VPLS egress endpoint associated with the respective device, if a destination endpoint identifier of the VPLS packet matches the VPLS egress endpoint; determine, responsive to a first VPLS egress endpoint matching the destination endpoint identifier, if the destination endpoint identifier matches a source endpoint identifier of the VPLS packet; and determine that the first VPLS egress endpoint is ineligible to receive the duplicate packet responsive to the destination endpoint identifier matching the source endpoint identifier.

Additionally or alternatively, in some embodiments the first and second devices are each further operable to: determine, for each VPLS egress endpoint associated with the respective device, if a destination endpoint identifier of the VPLS packet matches the VPLS egress endpoint; determine, responsive to a second VPLS egress endpoint matching the destination endpoint identifier if the destination endpoint identifier and a source endpoint identifier of the VPLS packet belong to a same split horizon group; and determine that the second VPLS egress endpoint is ineligible to receive the duplicate packet responsive to the destination endpoint identifier and the source endpoint identifier belonging to the same split horizon group.

BRIEF DESCRIPTION OF THE DRAWINGS

The foregoing and other objects, features and advantages of the invention will be apparent from the following more particular description of the preferred embodiments, as illustrated in the appended drawings, where.

In the figures like features are denoted by like reference characters.

DETAILED DESCRIPTION

Figure 1:
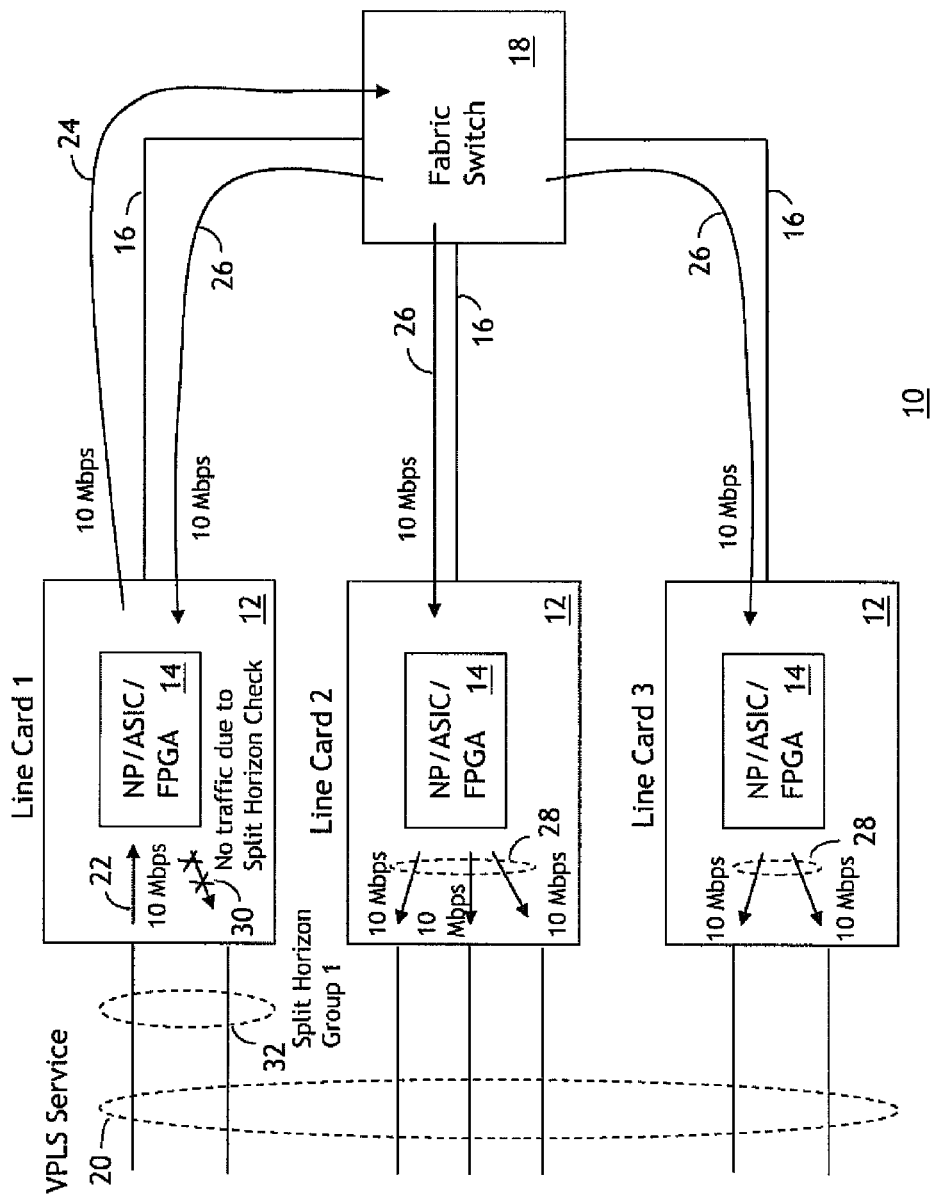
FIG. 1 depicts an apparatus for multicasting data packets in a system having a distributed architecture according to an embodiment of the invention.

FIG. 1 depicts an apparatus 10 for multicasting data packets in a system such as a data packet switch or router having a distributed architecture. The apparatus 10 includes a plurality of line cards 12. Each line card 12 has a device 14 for processing packets and is coupled to a fabric switch 18 via one or more respective fabric links 16. The device 14 for processing packets could be implemented as a network processor, field programmable gate array (FPGA), application specific integrated circuit (ASIC), microprocessor or any combination thereof. Likewise the fabric switch could be implemented in any of the aforementioned ways. The fabric switch 18 receives packet traffic from the line cards 12 via the fabric links 16 and forwards the packet traffic to the line cards 12 via the fabric links 16 in accordance with multicasting or unicasting requirements of the traffic and source suppression and split horizon requirements of VPLS service. The apparatus 10 pushes duplication of packets to the fabric switch 18 and the line cards 12 where VPLS egress endpoints 20 are configured. This way fabric bandwidth usage of the line card 12 at which traffic ingresses the apparatus (e.g. line card 1) is not affected by the number of endpoints 20 in the VPLS service.

To summarize operation of the apparatus 10, a packet 22 received at a line card 12 (e.g. line card 1) is sent to the fabric switch 18 as a single packet, the fabric switch 18 replicates just one packet per line card 12 and sends a respective replicated packet to each line card 12. The device 14 for processing packets on each line card 12 receives the replicated packet, duplicates the packet and sends one such duplicate packet towards each egress endpoint 20 on their respective line card 12 after performing source suppression and the split horizon group validation 30.

In more detail, an Ethernet packet 22 is received by the device 14 for processing packets of a line card 12 (e.g. line card 1). Destination MAC address of the incoming packet 22 is looked up in the VPLS forwarding database by the device 14 for processing packets, such as a network processor. If the packet 22 is a unicast packet and there is no match in the forwarding database or the packet is a multicast or a broadcast packet, then the packet 22 is sent towards the fabric switch 18 with a multicast fabric header. The multicast fabric header contains a VPLS service identifier, a VPLS source endpoint identifier and a source split horizon group identifier. The fabric switch 18 uses the multicast fabric header to replicate only one packet towards each line card 12 that the VPLS endpoints are configured on. When the respective device 14 for processing packets in each the line cards 12 receives the replicated packet, it starts to duplicate the packet towards each VPLS egress endpoint 20 as long as the destination endpoint identifier is not same as the source endpoint identifier (source suppression) and the source and the destination endpoints do not belong to the same split horizon group.

Figure 2:
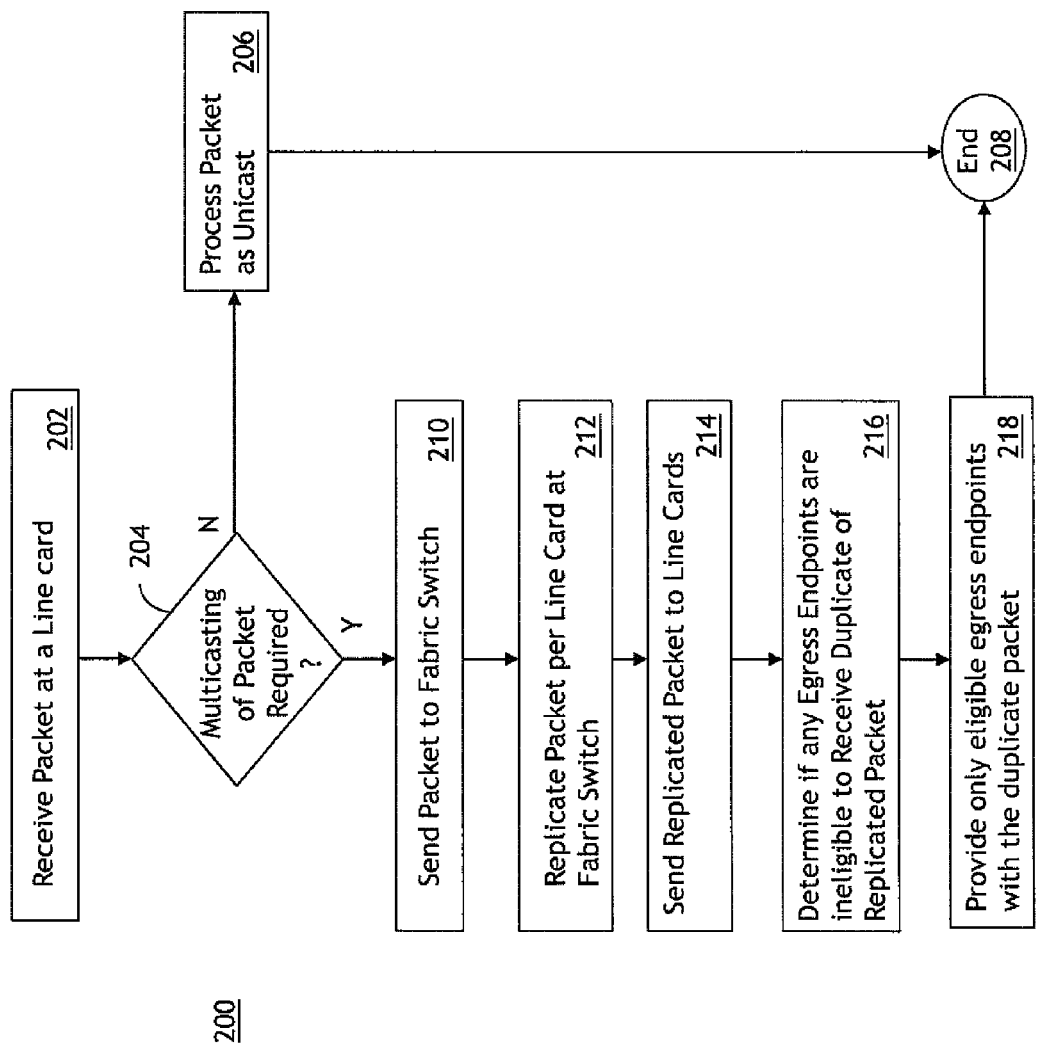
FIG. 2 depicts a method of multicasting data packets in a system having a distributed architecture according to another embodiment of the invention.

FIG. 2 depicts a method 200 of multicasting data packets in a system having a distributed architecture such as a packet switch or router. The method 200 starts by receiving 202 the packet at a first line card of a plurality of line cards in a system. Next a determination 204 if the packet requires multicasting is made. This determination 204 is made by performing, on a destination MAC address of the packet, a lookup operation in a forwarding database. If the lookup operation fails to find the destination MAC address in the forwarding database or a result of the lookup operation indicates that the packet is a multicast or broadcast packet; then the packet is deemed to require multicasting. If the packet does not require multicasting it is processed 206 as a unicast packet and the method ends 208. Otherwise the packet is sent 210 with a multicast header to a fabric switch of the system. The fabric switch replicates 212 the packet to obtain one replicated packet for each line card of the plurality of line cards. The fabric switch then sends 214 a respective replicated packet to each of the line cards. The method 200 then determines 216 if any egress endpoints of a service associated with the packet are ineligible to receive a duplicate packet of the replicated packet. This determination 216 is made by each line card for egress endpoints that are configured on, or otherwise correspond to, the line card. Next, a respective duplicate packet is provided 218 to each egress endpoint of the service except any such egress endpoint determined to be ineligible to receive the duplicate packet, after which the method 200 ends 208. The providing 218 of a respective duplicate packet to each eligible egress endpoint is done by each line card for egress endpoints that are configured on, or otherwise correspond to, the line card.

In a preferred embodiment the packet is a VPLS packet, the egress endpoints are VPLS egress endpoints, and the service is a VPLS service. However, embodiments of the invention are not restricted to those relating to a VPLS service.

In the case where the method 200 relates to a VPLS service, determining 216 if any VPLS egress endpoints are ineligible to receive the duplicate packet includes determining, for each VPLS egress endpoint, if a destination endpoint identifier of the VPLS packet matches the VPLS egress endpoint. If a given VPLS egress endpoint matches the destination endpoint identifier, a determination whether the destination endpoint identifier matches a source endpoint identifier of the VPLS packet or not is made. If the destination endpoint identifier matches the source endpoint identifier then the given VPLS egress endpoint is deemed ineligible to receive the duplicate packet. In this manner the method 200 meets the source suppression requirement of the VPLS service.

Furthermore, in the case where the method 200 relates to a VPLS service, determining 216 if any VPLS egress endpoints are ineligible to receive the duplicate packet includes determining, for each VPLS egress endpoint, if a destination endpoint identifier of the VPLS packet matches the VPLS egress endpoint. If a given VPLS egress endpoint matches the destination endpoint identifier, a determination is made whether or not the destination endpoint identifier and the source endpoint identifier belong to the same split horizon group. If the destination endpoint identifier and the source endpoint identifier belong to the same split horizon group then the given VPLS egress endpoint is deemed ineligible to receive the duplicate packet. In this manner the method 200 meets the aforementioned split horizon group requirement of the VPLS service.

Advantageously, bandwidth usage between the line cards and the fabric switch are optimized for multicasting.

Numerous modifications, variations and adaptations may be made to the embodiments of the invention described above without departing from the scope of the invention, which is defined in the claims.

What is claimed is:

1. A method of multicasting a packet comprising:
   receiving the packet at a first line card of a plurality of line cards in a system;
   determining if the packet requires multicasting;
   sending, responsive to the packet requiring multicasting, the packet with a multicast header to a fabric switch of the system;
   replicating, by the fabric switch, the packet to obtain a replicated packet;
   sending, by the fabric switch, the replicated packet to one or more line cards of the plurality of line cards;
   receiving, by the first line card, the replicated packet from the fabric switch;
   determining, by the first line card, if any egress endpoints of a service associated with the packet and that correspond to the first line card are ineligible to receive a duplicate packet of the replicated packet; and
   providing, by the first line card, the duplicate packet to each egress endpoint of the service that correspond to the first line card except any such egress endpoint determined to be ineligible to receive the duplicate packet;
receiving, by a second line card, the replicated packet from the fabric switch;
   determining, by the second line card, if any egress endpoints of a service associated with the packet and that correspond to the second line card are ineligible to receive a duplicate packet of the replicated packet; and
   providing, by the second line card, the duplicate packet to each egress endpoint of the service that correspond to the second line card except any such egress endpoint determined to be ineligible to receive the duplicate packet.

2. The method of claim 1 wherein the packet is a Virtual Private Local Area Network (LAN) Service (VPLS) packet, the egress endpoints are VPLS egress endpoints, and the service is a VPLS service.

3. A method of multicasting a packet comprising:
   receiving the packet at a line card of a plurality of line cards in a system;
   determining if the packet requires multicasting;
   sending, responsive to the packet requiring multicasting, the packet with a multicast header to a fabric switch of the system;
   replicating, by the fabric switch, the packet to obtain a replicated packet;
   sending, by the fabric switch, the replicated packet to one or more line cards of the plurality of line cards;
   determining, by a line card of the plurality of line cards, if any egress endpoints of a service associated with the packet are ineligible to receive a duplicate packet of the replicated packet; and
   providing the duplicate packet to each egress endpoint of the service except any such egress endpoint determined to be ineligible to receive the duplicate packet,
   wherein the packet is a Virtual Private Local Area Network (LAN) Service (VPLS) packet, the egress endpoints are VPLS egress endpoints, and the service is a VPLS service,
   wherein determining if any VPLS egress endpoints are ineligible to receive the duplicate packet comprises:
   determining, for each VPLS egress endpoint, if a destination endpoint identifier of the VPLS packet matches the VPLS egress endpoint;
   determining, responsive to a first VPLS egress endpoint matching the destination endpoint identifier, if the destination endpoint identifier matches a source endpoint identifier of the VPLS packet; and
   determining that the first VPLS egress endpoint is ineligible to receive the duplicate packet responsive to the destination endpoint identifier matching the source endpoint identifier.

4. A method of multicasting a packet comprising:
   receiving the packet at a line card of a plurality of line cards in a system;
   determining if the packet requires multicasting;
   sending, responsive to the packet requiring multicasting, the packet with a multicast header to a fabric switch of the system;
   replicating, by the fabric switch, the packet to obtain a replicated packet;
   sending, by the fabric switch, the replicated packet to one or more line cards of the plurality of line cards;
   determining, by a line card of the plurality of line cards, if any egress endpoints of a service associated with the packet are ineligible to receive a duplicate packet of the replicated packet; and
   providing the duplicate packet to each egress endpoint of the service except any such egress endpoint determined to be ineligible to receive the duplicate packet,
   wherein the packet is a Virtual Private Local Area Network (LAN) Service (VPLS) packet, the egress endpoints are VPLS egress endpoints, and the service is a VPLS service,
   wherein determining if any VPLS egress endpoints are ineligible to receive the duplicate packet comprises:
   determining, for each VPLS egress endpoint, if a destination endpoint identifier of the VPLS packet matches the VPLS egress endpoint;
   determining, responsive to a first VPLS egress endpoint matching the destination endpoint identifier, if the destination endpoint identifier and a source endpoint identifier of the VPLS packet belong to a same split horizon group; and
   determining that the first VPLS egress endpoint is ineligible to receive the duplicate packet responsive to the destination endpoint identifier and the source endpoint identifier belonging to the same split horizon group.

5. The method of claim 3 wherein determining if any VPLS egress endpoints are ineligible to receive the duplicate packet further comprises:
   determining, for each VPLS egress endpoint, if a destination endpoint identifier of the VPLS packet matches the VPLS egress endpoint;
   determining, responsive to a second VPLS egress endpoint matching the destination endpoint identifier, if the destination endpoint identifier and a source endpoint identifier of the VPLS packet belong to a same split horizon group; and
   determining that the VPLS second egress endpoint is ineligible to receive the duplicate packet responsive to the destination endpoint identifier and the source endpoint identifier belonging to the same split horizon group.

6. The method of claim 1 wherein determining if the packet requires multicasting comprises:

performing, on a destination Media Access Control (MAC) address of the packet, a lookup operation in a forwarding database; and determining that the packet requires multicast forwarding responsive to the lookup operation failing to find the destination MAC address in the forwarding database or a result of the lookup operation indicating that the packet is a multicast or broadcast packet.

7. The method of claim 2 wherein determining if any VPLS egress endpoints of the VPLS service are ineligible to receive the duplicate packet comprises:

determining that a first VPLS egress endpoint of the VPLS service matches a destination endpoint identifier of the VPLS packet and a source endpoint identifier of the VPLS packet, thereby making the first VPLS egress endpoint ineligible to receive the duplicate packet.

8. The method of claim 2 wherein determining if any VPLS egress endpoints of the VPLS service are ineligible to receive the duplicate packet comprises:

determining that a second VPLS egress endpoint matches a destination endpoint identifier of the VPLS packet; and determining that the destination endpoint identifier and a source endpoint identifier of the VPLS packet are in a same split horizon group, thereby making the second VPLS egress endpoint ineligible to receive the duplicate packet.

9. A method of multicasting a packet comprising:

receiving the packet at a line card of a plurality of line cards in a system;

determining if the packet requires multicasting;

sending, responsive to the packet requiring multicasting, the packet with a multicast header to a fabric switch of the system;

replicating, by the fabric switch, the packet to obtain a replicated packet;

sending, by the fabric switch, the replicated packet to one or more line cards of the plurality of line cards;

determining, by a line card of the plurality of line cards, if any egress endpoints of a service associated with the packet are ineligible to receive a duplicate packet of the replicated packet; and providing the duplicate packet to each egress endpoint of the service except any such egress endpoint determined to be ineligible to receive the duplicate packet, wherein the packet is a Virtual Private Local Area Network (LAN) Service (VPLS) packet, the egress endpoints are VPLS egress endpoints, and the service is a VPLS service, wherein determining if any VPLS egress endpoints of the VPLS service are ineligible to receive the duplicate packet comprises:

determining that a first VPLS egress endpoint of the VPLS service matches a destination endpoint identifier of the VPLS packet and a source endpoint identifier of the VPLS packet, thereby making the first VPLS egress endpoint ineligible to receive the duplicate packet, wherein determining if any VPLS egress endpoints of the VPLS service are ineligible to receive the duplicate packet further comprises:

determining that a second VPLS egress endpoint matches the destination endpoint identifier of the VPLS packet; and determining that the destination endpoint identifier and the source endpoint identifier are in a same split horizon group, thereby making the second VPLS egress endpoint ineligible to receive the duplicate packet.

10. An apparatus for multicasting a packet comprising:

a first device operable to receive the packet; and a fabric switch coupled to the first device via a first fabric link, the fabric switch being operable to receive the packet from the first device and to replicate the packet to obtain a replicated packet, wherein the first device is further operable to:

determine if the packet requires multicasting, send, responsive to the packet requiring multicasting, the packet with a multicast header to the fabric switch, receive the replicated packet from the fabric switch determine that an egress endpoint of a service associated with the packet and that corresponds to the first device is ineligible to receive a duplicate packet of the replicated packet, and provide the duplicate packet to egress endpoints of the service that correspond to the first device except such egress endpoints determined to be ineligible; and a second device coupled to the fabric switch via a second fabric link, the second device being operable to:

receive the replicated packet from the fabric switch, determine an egress endpoint of a service associated with the packet and that corresponds to the second device is ineligible to receive the duplicate packet, and provide the duplicate packet to egress endpoints of the service that correspond to the second device except such egress endpoints determined to be ineligible.

11. The apparatus of claim 10 wherein the packet is a Virtual Private Local Area Network (LAN) Service (VPLS) packet, the egress endpoints are VPLS egress endpoints, and the service is a VPLS service.

12. The apparatus of claim 11 wherein the first device and the second device are each further operable to:

determine, for each VPLS egress endpoint, if a destination endpoint identifier of the VPLS packet matches the VPLS egress endpoint;

determine, responsive to a first VPLS egress endpoint matching the destination endpoint identifier, if the destination endpoint identifier matches a source endpoint identifier of the VPLS packet; and determine that the first VPLS egress endpoint is ineligible to receive the duplicate packet responsive to the destination endpoint identifier matching the source endpoint identifier.

13. The apparatus of claim 11 wherein the first device and the second device are each further operable to:

determine, for each VPLS egress endpoint, if a destination endpoint identifier of the VPLS packet matches the VPLS egress endpoint;

determine, responsive to a first VPLS egress endpoint matching the destination endpoint identifier, if the destination endpoint identifier and a source endpoint identifier of the VPLS packet belong to a same split horizon group; and determine that the first VPLS egress endpoint is ineligible to receive the duplicate packet responsive to the destination endpoint identifier and the source endpoint identifier belonging to the same split horizon group.

14. The apparatus of claim 12 wherein the first device and the second device are each further operable to:

determine, responsive to a second VPLS egress endpoint matching the destination endpoint identifier, if the destination endpoint identifier and the source endpoint identifier of the VPLS packet belong to a same split horizon group; and determine that the second VPLS egress endpoint is ineligible to receive the duplicate packet responsive to the destination endpoint identifier and the source endpoint identifier belonging to the same split horizon group.

15. The apparatus of claim 10 wherein the first device is further operable to:

perform on a destination Media Access Control (MAC) address of the packet a lookup operation in a forwarding database; and determine that the packet requires multicast forwarding responsive to the lookup operation failing to find the destination MAC address in the forwarding database or a result of the lookup operation indicating that the packet is a multicast or broadcast packet.

16. The method of claim 1, wherein the fabric switch replicates only one packet toward each line card of the plurality of line cards.

17. The apparatus of claim 10, wherein the fabric switch is further operable to send only a single replicated packet to the first device.

\* \* \* \* \*